April 15, 1969  R. C. SCHENCK, JR  3,438,388
FULLY LINED VALVE
Filed Oct. 19, 1965  Sheet 1 of 3
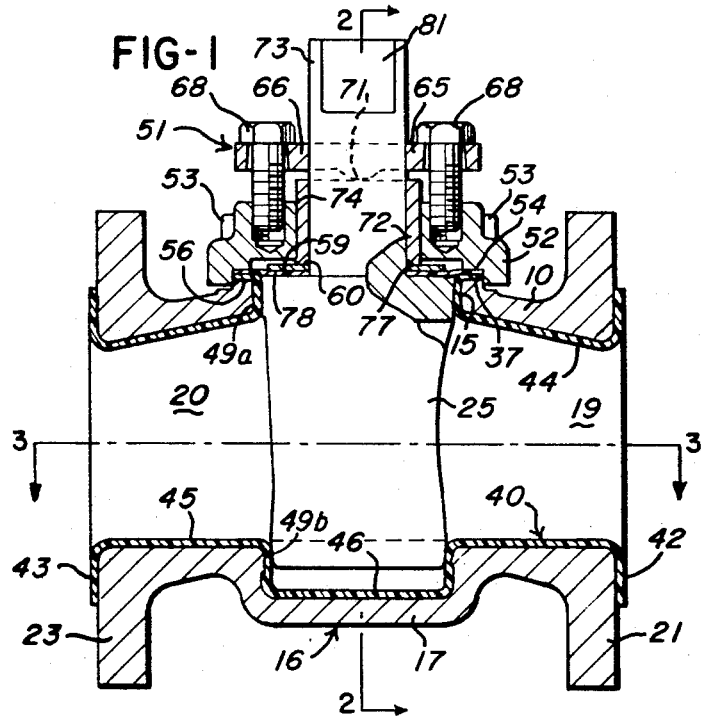
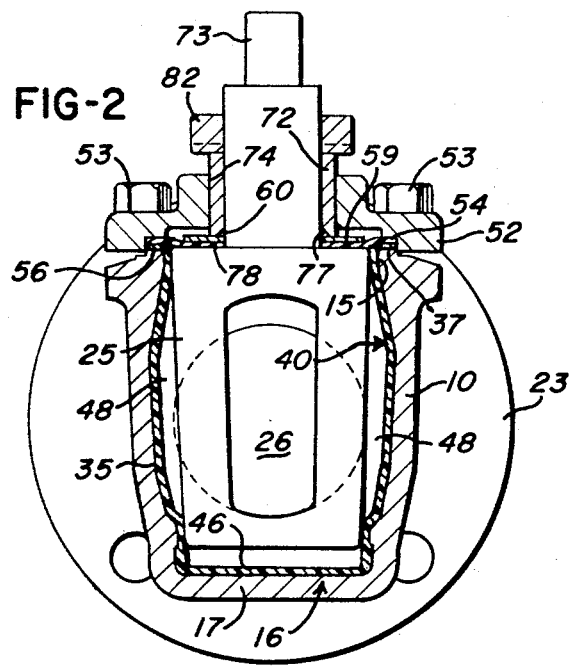
INVENTOR
ROBERT C. SCHENCK, JR.
BY
Marechal, Biebel, French & Bugg
ATTORNEYS

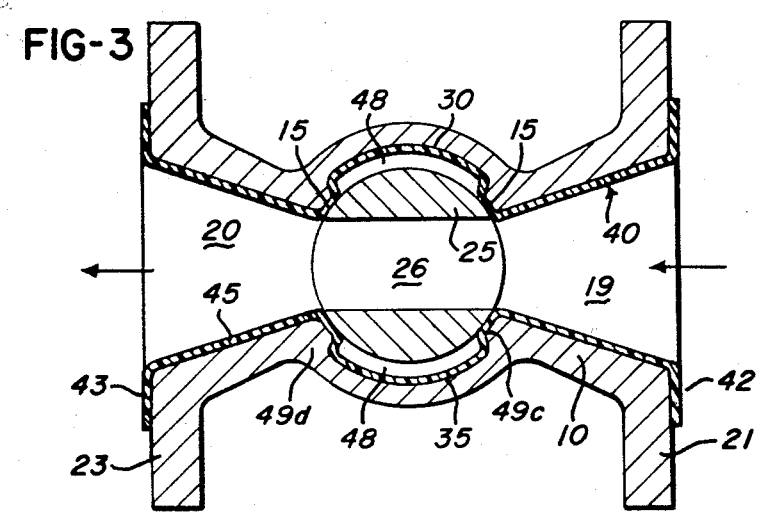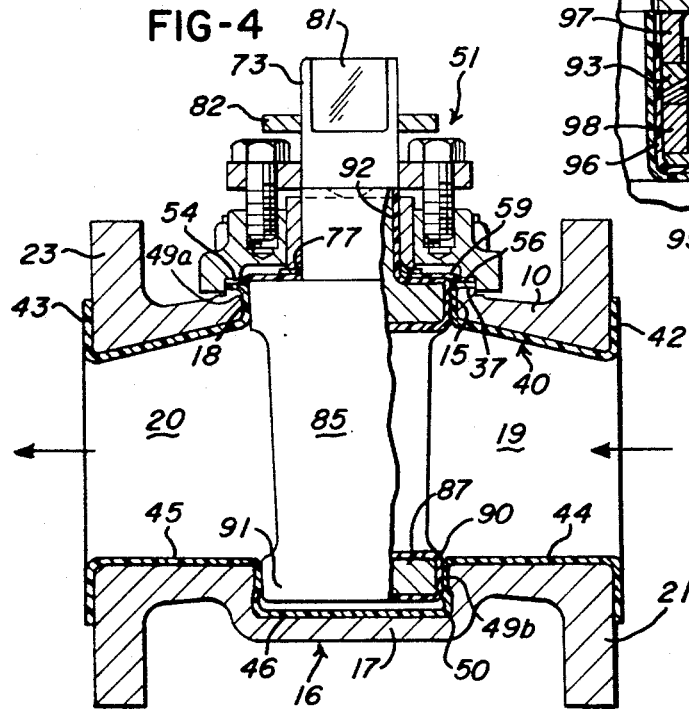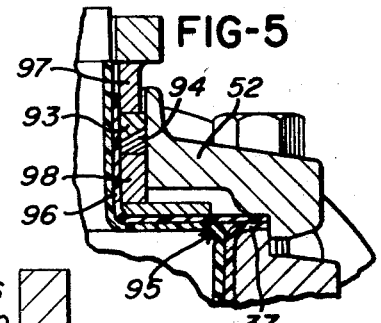

United States Patent Office 3,438,388
Patented Apr. 15, 1969

3,438,388
FULLY LINED VALVE
Robert C. Schenck, Jr., Dayton, Ohio, assignor to The Duriron Company, Inc., Dayton, Ohio, a corporation of New York
Filed Oct. 19, 1965, Ser. No. 497,825
Int. Cl. F16l 7/00; B27j 5/00
U.S. Cl. 137—375
10 Claims

ABSTRACT OF THE DISCLOSURE

A corrosion resistant valve has a continuous polytetrafluoroethylene lining and includes a rotatable closure member which is coated with a fluorocarbon resin. Positive shutoff is provided, and all metal parts in the interior of the valve are protected by the polytetrafluoroethylene lining on the body and the fluorocarbon resin lining are on surfaces of the closure member. A method of fabricating such a valve is described in which the polytetrafluoroethylene liner is formed from a tube of isostatically molded PTFE.

---

This invention relates to lined valves and more particularly to an improved plug valve provided with a polytetrafluoroethylene liner so that all of the interior surfaces of the valve exposed to fluid are protected by a corrosion resistant sheath.

Polytetrafluoroethylene (PTFE) available under the trademark Teflon is supplied in several different grades including Teflon 1, 1B and 5 which are general purpose molding powders, Teflon 7 an ultra-fine molding powder, and Teflon 6 and 6C which are special purpose molding powders suspended in a solvent such as naphtha and used for extrusion, and Teflon 30 which is an aqueous dispersion of PTFE. PTFE resins are to be distinguished from copolymers of tetrafluoroethylene and hexafluoropropylene, a typical example of the latter copolymer being a material available under the trademark Teflon FEP. This copolymer exhibits a melt viscosity sufficiently low for conventional thermoplastic processing. Although PTFE is considered a thermoplastic it cannot be processed by the conventional thermoplastic processing techniques. Additionally, parts fabricated of PTFE are stable over a wider range of temperatures than parts of the copolymer of tetrafluoroethylene and hexafluoropropylene. Unlike the copolymer, PTFE possesses an infinite melt viscosity and a plastic memory which tends to cause a heat shaped product to return to the shape in which it was originally formed. For further details as to the nature and processing of these two materials reference is made to Modern Plastics Encyclopedia, volume 40, No. 1A, September 1963.

PTFE has been used in plug valves and operates satisfactorily as a sealing element and to provide some degree of corrosion resistance. The seal element is in the form of a sleeve and is secured between the body bore and the closure member or valve plug to prevent movement thereof during rotation of the plug as well as axial shifting or displacement thereof in response to increases in temperature and pressure.

In United States Patent No. 2,987,295 issued June 6, 1961, and assigned to the same assignee as this application, a valve structure is shown which overcomes the problem characteristically identified as "blown" liners or deflection of a portion of the liner into the path of the plug port as a result of increase in temperature and pressure. Additionally, application Ser. No. 135,298, filed Aug. 31, 1961, now U.S. Patent No. 3,199,835 and assigned to same assignee as the present invention, describes another valve structure in which dimensional stability of the liner is maintained over a wide range of temperatures and pressures. Valves of the type described in the above identified patent and application are intended to be used in conduits handling corrosive materials and since the sleeve is received in the bore, the corrosive material contacts the through passages in the body which communicate with the bore as well as the outer surface and port through the plug. Accordingly, bodies for the valves of the above described type are made of corrosion resistant material while the plug is generally of stainless steel or the like.

It is desirable to provide a valve of the plug valve type which may be fabricated or lightweight materials which need not exhibit the corrosion resistance of metal alloys such as Duriron, Durimet or Durichlor or stainless steel and which are lighter in weight. Also, it is desirable to provide an improved structure which prevents deflection of the liner material or movement or displacement thereof while retaining the corrosion resistant characteristics associated with fluorocarbon polymers. While fully lined plug valves are known utilizing a copolymer of tetrafluoroethylene and hexafluoropropylene (Teflon FEP) as a liner material which is formed into the valve body by conventional thermoplastic processing techniques, the use of this copolymer limits the temperature range in which the valve can be operated because of the thermoplastic nature of this copolymer. As a general rule, the copolymer exhibits comparable characteristics with respect to low coefficient of friction, corrosion resistance and several other physical properties of PTFE, but being a true thermoplastic, the copolymer is incapable of use in relatively high temperature ranges at which PTFE can be used.

The use of PTFE as a material for a full liner offers several advantages over the use of elastomeric materials as full liners in a valve for the following reasons. Plug valves having an elastomeric liner on the body are well known but include a cylindrical plug received within a cylindrical bore and thus it is difficult to make any adjustment of the plug relative to the bore in the event a small leak develops in the valve.

The valve in accordance with the present invention includes a relatively small taper and preferably no more than from 3° to 4° on a side for smaller sizes and somewhat greater for the larger size valves. This is in the range of Morse tapers and the like wherein a gripping and non-rotating action is developed. Accordingly by applying relatively small axial pressure on the tapered plug to force it into the tapered body relatively high radial pressures are developed to provide efficient sealing of the plug liner and body. This is not possible with a cylindrical plug received within a cylindrical body.

A further difference between a tapered plug valve and a cylindrical plug valve utilizing an elastomeric sealing element is the fact that in the latter the resiliency of the sealing member is utilized to provide a seal while in a tapered plug valve, particularly of the type herein described, a sealing action is developed by the relative taper of the bore and plug, the PTFE liner operating to provide a surface of low coefficient of friction between the body and the plug while at the same time providing a high degree of corrosion resistance.

While elastomeric materials are known which are capable of providing some corrosion protection by specified types each elastomer must be specifically formulated depending upon the type service to which it is exposed. Such a procedure requires formulation of several different liner materials whereas the liner of the present invention is highly resistant to corrosion and is virtually inert with respect to a wide variety of corrosive materials including for example a pickling solution which is composed of 95% sulfuric acid and 5% hydrofluoric acid. Further PTFE is capable of being used in a higher temperature range than most of the common elastomeric materials used as liners, for example 400° to 550° F.

Accordingly, it is a primary object of the present invention to provide a valve wherein all the interior surfaces which are contacted by fluid are covered by a relatively thin sheath or liner of polytetrafluoroethylene.

It is another object of the present invention to provide a valve structure having low turning torque in which the interior surfaces of the body are covered with a one-piece sheath or liner of polytetrafluoroethylene and wherein the surfaces of the plug including the port therethrough are covered with a layer of polytetrafluoroethylene or a copolymer of tetrafluoroethylene and hexafluoropropylene.

Another object of the present invention is to provide a plug valve with a fluid impervious one-piece liner which contacts substantially all of the fluid contacting surfaces of the body thereby substantially eliminating the difficulty of blown or displaced liners, and which is capable of operating over a wide temperature range.

A further object of the present invention is to provide an improved method by which an integral one-piece liner may be provided to cover all surfaces of a valve which are exposed to fluid flow.

Other objects and advantages of the invention will be apparent from the following description, the accompanying drawings and the appended claims.

In the drawings:

FIG. 1 is a view partly in section and partly in elevation of a fully lined valve in accordance with the present invention;

FIG. 2 is a view along the line 2—2 of FIG. 1 with parts in elevation and parts in section showing the valve in the open position with the plug port aligned with the body ports;

FIG. 3 is a section along the line 3—3 of FIG. 1;

FIG. 4 is a view similar to FIG. 1 showing a valve in accordance with the present invention wherein both the plug and body are lined;

FIG. 5 is a fragmentary section of a valve stem seal structure in accordance with the present invention;

Figure 6:
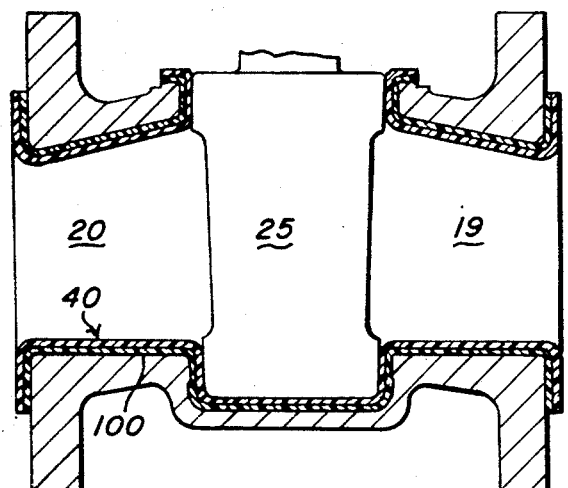
FIG. 6 is a view similar to FIG. 1 showing a valve structure wherein the liner is composed of two different fluorocarbon plastic materials.

Referring to the drawings, which illustrate preferred embodiments of the present invention, FIG. 1 shows a fully lined valve including a one-piece metallic body 10 having a tapered bore 15 extending transversely thereof. The body may be of ductile iron, aluminum or carbon steel. The base 16 of the bore is closed by an integral portion 17 of the body while the other end 18 thereof is open. The body includes through ports 19–20 communicating with the bore for passage of fluid through the valve. The body also includes end flanges 21 and 23 for mounting the valve in a conduit.

Received in the tapered bore 15 is a tapered valve plug or closure member 25 which includes a port 26 therein for alignment with the body ports to permit flow through the valve, the plug being rotatable to place the plug port 26 at right angles to the through ports 19–20 to shut off flow to the valve in the usual manner. The bore of the body is preferably provided with relief areas 30 and 35 having a radial dimension greater than the radial dimension of the non-relieved areas so as to provide at least two spaced relief areas located in the bore 90° with respect to the through ports. The open end 18 of the valve body includes a circumferential flat 37 which is preferably formed by machining the metallic casting of the body after production thereof.

Received in the bore and covering all interior surfaces of the body exposed to fluid flow is an integral one-piece polytetrafluoroethylene liner 40 (shown as stippled) including flared end portions 42 and 43 turned outwardly and engaging flanges 21 and 23 respectively, so that as the valve is mounted in a conduit, the flared end portions of the liner are in contact with the ends of the conduit. The liner includes portions 44 and 45 in contact with all portions of the through ports 19–20 as well as portion 46 covering the bottom 16 of the bore 15.

The presence of relief areas 30 and 35 in the bore which receives the liner 40 provides a space 48 between the outer surface of the plug and the opposing surface of the liner wherein there is no contact between the liner and the plug and thus is essentially an area of zero pressure. Sealing pressure is established between the bore and the outer surface of the plug by preferably continuous circumferential seal areas 49a and b and continuous seal areas 49c and d which surround the plug ports and which are joined to circumferential seal areas 49a and b. Thus, the plug port 26 is surrounded by high pressure seal areas in the open and closed position and during rotation of the plug from one position to the other, there are no exposed edge portions which may be unsupported as the plug port sweeps across the surface of the liner. Immediately below circumferential seal area 49b and formed in the base of the bore is an annular relief area 50 which is completely covered by portion 46 of the liner as shown. The purpose of the various relief areas is to reduce the turning torque of the valve and in the case of relief area 50 it provides for axial movement of the plug in the event some adjustment in sealing pressure is needed.

A top cap assembly 51 is provided which includes a top cap 52 mounted on the body by bolt and nut assemblies 53, the portion of the top cap facing the body being provided with a counterbore 54 which is in opposed relation to the circumferential flat 37 on the body. The liner 40 includes a circular portion 56 in contact with the flat, and positioned between the counterbore and the liner is a PTFE diaphragm member 59 including an inner cylindrical section 60. By tightening down on the bolt assemblies 53 the top cap is secured to the body with a seal being provided therebetween by the diaphragm and the continuous ring portion 56 which is integral with the liner 40.

Mounted on the top cap is an adjuster mechanism 65 including an adjuster member 66 secured to the top cap by bolts 68. The adjuster includes protrusions 71 which bear against an annular thrust collar 72 encircling a stem 73 of the plug and positioned between the stem and the top cap 52, the latter being provided with an opening 74 for passage of the plug stem therethrough. The internal periphery of the thrust collar immediately above the plug is beveled as indicated at 77 while a thrust washer 78 is positioned between the thrust collar and diaphragm 59. The thrust collar cooperates with the thrust washer and diaphragm to provide a seal preventing leakage of fluid between the top cap 52 and stem 73. By adjusting bolts 68, varying pressure can be exerted on the top surface of the plug to force the tapered plug into the tapered bore in the event adjustment of the sealed plug, liner and body is necessary. The plug stem 73 is provided with flats 81 for attachment to an operating handle in the usual manner and a stop collar 82 is preferably mounted on the top cap assembly in a conventional manner for limiting rotation of the plug through a 90° turn in the usual manner.

The use of full liner 40 of PTFE provides several advantages in addition to corrosion protection. The portions 44 and 45 of the one-piece integral liner extending through the body ports 19 and 20 operate to prevent rotation of the liner relative to the body. By providing flared end portions of the liner exposed to fluid flow which may be 21 and 23, several difficulties encountered in conventional bore liners have been eliminated. First, there are no edge portions of the liner exposed to fluid flow which may be deflected under certain conditions or temperature and pressure into the bore and subsequently cut by the plug in rotation from one position to another as described in U.S. Patent 2,987,295 previously identified. Also, this arrangement substantially eliminates the possibility of fluid passing between the body and the liner and becoming entrapped and possibly bulging the liner inwardly to an extent wherein portions of the liner may be cut when rotating the plug from the closed to the open position. Also, the valve may be fabricated without relief areas 30 and 35 since the liner is held in position due to the portions thereof extending to the through ports 19 and 20. In the case of larger size valves, for example, 4-inch and 6-inch and higher in which the turning torque increases, it may be desirable to utilize relief areas 30 and 35 in order to reduce the area of contact between the lined bore and plug so as to reduce the torque required to turn the plug from one position to another.

Referring now to FIG. 4 wherein like reference numerals have been used for the same parts, a fully lined valve is shown including a fully lined plug 85. The plug includes a metal core or center 87 and an outer covering or sheath 90 of a fluorocarbon resin such as PTFE or a copolymer or tetrafluoroethylene and hexafluoropropylene. This sheath covers all of the exposed surfaces of the plug including the port 26 and the base 91 thereof as well as extending at least partially up the stem 73 as indicated at 92. Like plug 25, plug 83 is tapered and received in a tapered bore.

In the case of a plug which is completely lined with the previously identified copolymer, this may be done by conventional thermoplastic processing techniques. In the case of a plug lined with PTFE, this may be done in the is static technique as described in application Ser. No. 497,869 filed of even date herewith and reference is made thereto.

The advantage of utilizing a fully sheathed plug is that the material of the plug may be ductile iron in the case of the copolymer or aluminum in the case of PTFE and thus the plug need not be stainless steel as has been the case with plug valves of the prior art, although stainless steel may be used, if desired. By coating the plug with a fluorocarbon resin, the turning torque of the valve is reduced since there is a fluorocarbon resin rotating in contact with a PTFE liner. For example, a 3-inch valve with a lined plug in accordance with the present invention has a turning torque of 40 foot pounds while a 3-inch plug valve of the prior art having a tubular sleeve in the bore only has a turning torque of about 60 foot pounds. Also, a fully lined valve with a fully lined plug exhibited about 10% less pressure drop through the valve when compared to an unlined valve of the same dimensions.

Referring to FIG. 5, a preferred top seal structure is shown in fragmentary section wherein the seal is provided by a pair of annular PTFE wedge rings 93 and 94 received between the top cap 52 and a PTFE diaphragm 95. The diaphragm includes a vertical annular section 96 and the coated potrion 92 of the valve stem. Annular top and bottom glands 97 and 98 contact rings 93 and 94 respectively, to compress the rings, thereby forming a seal. An annular disk-like metallic thrust washer is positioned between the bottom gland 98 and the PTFE diaphragm 95.

This type seal has several advantages, among which is the fact that the seal is between the stem and the top cap. Thus, failure of the diaphragm does not necessarily mean failure of the seal. Also, any pressure under the diaphragm will act through the thrust washer to compress the wedge rings. In this way, a seal is established at the stem without having to push the gland down hard against the top of the plug which would tend to raise the turning torque.

It is also possible in accordance with the present invention to utilize two different fluorocarbon resins as a liner, and this arrangement offers a mechanism by which permeability of various vapors or gases through the liner may be controlled. Referring to FIG. 6 wherein the same reference numerals have been employed and which does not show the top structure which is similar to that previously described, the valve includes the PTFE liner 40 previously described, and interposed between the PTFE liner 40 and the surfaces of the valve body exposed to fluid flow is a second liner 100 which may be of a copolymer of tetrafluoroethylene and hexafluoropropylene.

As noted previously, PTFE exhibits an infinite melt viscosity and as a practical matter it is difficult to provide thin sections of PTFE free of micro-voids. The presence of micro-voids in thin sections of PTFE permits penetration or permeation of certain vapors, the degree of penetration or permeability being related to the density, and thus the presence of voids. Since the copolymer of tetrafluoroethylene and hexafluoropropylene has a relatively low melt viscosity and may be processed by conventional thermoplastic processing techniques, relatively thin sections of copolymer may be formed and possess an extremely small order of micro-voids and is thus less permeable to certain materials than a thin section of PTFE. By utilizing the two fluorocarbon materials together the permeability of vapors or liquids through the composite liner is reduced while retaining the corrosion resistant characteristics of this group of materials.

Additionally, the copolymer acts as a cement during the formation of the liner in the body by wetting both the PTFE and the metal causing at least a partial adherence of the PTFE to the body. This procedure will be described more fully hereinbelow.

Figure 7:
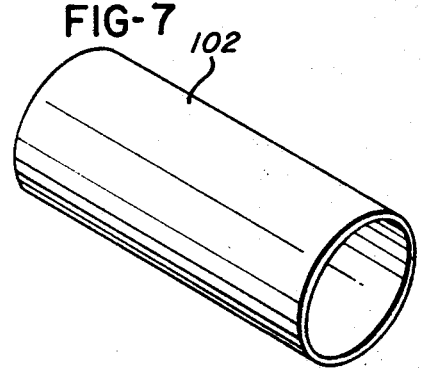
FIG. 7 is a view in perspective of the tubular member used to form the liner of the valve in accordance with the present invention.
Figure 9:
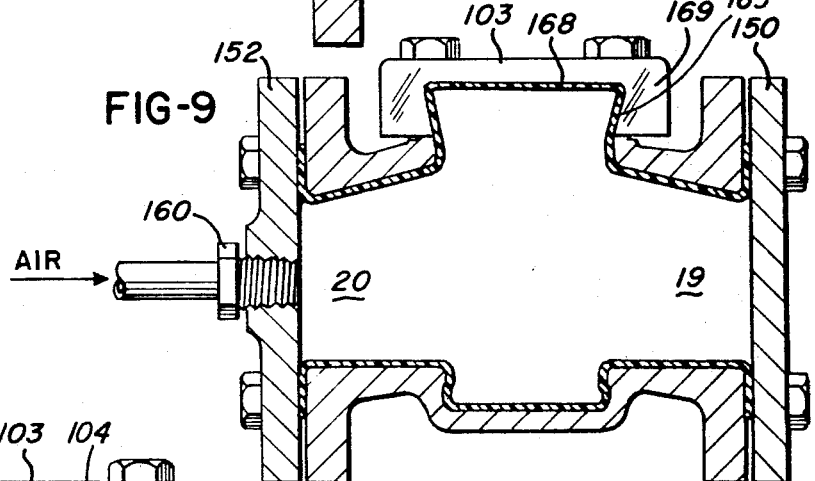
FIG. 9 is a view similar to FIG. 8 showing the tube expanded into place to form a liner.
Figure 8:
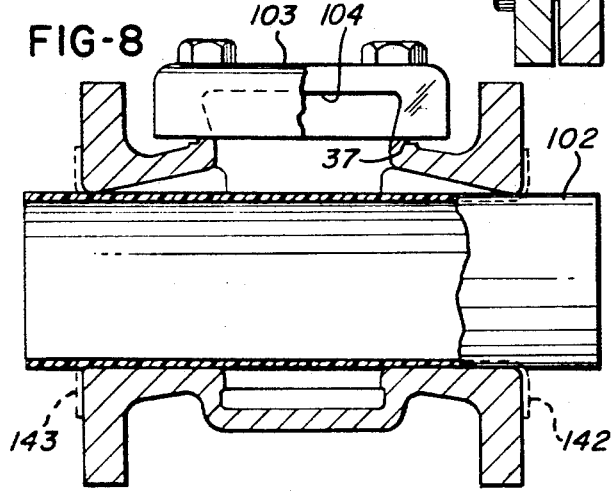
FIG. 8 is a view partly in section and partly in elevation illustrating the relative position of the tube of FIG. 7 in the valvebody preparatory to expanding the tube in the valve body.

The method by which a fully lined valve is provided in accordance with the present invention may be understood with reference to FIGS. 7 through 9 which illustrate the various subassemblies utilized in fabricating the fully lined valve of the present invention. For purposes of explanation it will be assumed that the valve to be lined is a 3-inch valve. A hollow cylindrical tubular PTFE member 102 is provided as shown in FIG. 7 having a lengthwise dimension somewhat greater than the flange to flange dimension of the valve body to be lined, for example three inches, so that the ends of the liner project beyond the flanges by approximately 1½ inches. The initial cross-sectional dimension of the tube is approximately 0.150 inch, and the center section thereof preferably includes a thickened portion, approximately 0.03 inch in order to provide more bulk of material in the center section of the tube than at the ends thereof. The diameter of the tube is such that it can be inserted through the ports, as shown in FIG. 7. In the event that the ports are non-circular, the diameter of the tube is such that it may be deformed slightly to conform generally to the shape of the ports.

The tube is inserted into a body having the desired internal configuration, i.e., pockets and grooves. The valve body which is to be lined is provided with a cover cap 103 which is mounted over the open end 18 of the bore and secured to the circumferential flat 37 in sealing relation. The cap 103 is provided with a generally annular cavity 104 which is positioned in opposing relation with the bore 15 of the valve body. The tube 102 is inserted into the body, and the ends thereof are flared as shown in dotted lines at 142 and 143, and thereafter blank flanges 150 and 152 are clamped to the flanges 21 and 23, respectively, to seal the ends of the tube to the flanges. Blank flange 152 is provided with a quick disconnect pressure tap 160. The entire assembly with the blank flanges mounted thereon is placed in an oven and heated to raise the temperature of the tube 102 to between 400° to 650° F. so that it becomes soft and pliable. The assembly is then removed and while the liner is still above 500° F., pressure is applied through the tap 160 to the interior of the tube to force the softened tube outwardly against the internal surfaces of the valve body and the cavity 104 of the cap as shown in FIG. 9.

During expansion of the tube 102, a generally cylindrical portion 165 is formed which extends out of the bore and which is later flared outwardly to form the circumferential flange 56 of the liner which is received over flat 37 of the body. This operation which is described as "ballooning" the tube reduces the cross-sectional dimension of the tube and the additional thickness of material in that portion of the tube which is received in the bore of the body provides additional material whereby the liner thickness may be maintained above a predetermined minimum. The heating operation usually takes approximately two hours and the pressure used to expand the tube varies with the temperature of the tube and between 250 and 350 pounds per square inch has been found satisfactory. The expansion of the tube reduces the section thereof to about 0.080 inch which has been found satisfactory.

After pressure has been applied to the interior of the tube 102 and while pressure is maintained therein, the body and the expanding tube are quenched to "freeze" or quick set the tube into the expanded position as a liner. Once the body has cooled down to room temperature, the cap 103 is removed, and the protruding portion 168 of the tube received in the cavity 104 is cut approximately along line 169 so as to provide the circumferential flange 56 which is received over the circumferential flat 37 on the open end 18 of the bore.

The remaining steps in the assembly of the valve include removing the blank flanges 150 and 152 and utilizing a sizing or dummy plug which is inserted into the lined bore and has pressure applied to the end thereof in order to size the liner in the bore so as to provide a seat for the working plug. After the sizing operation has been completed, the working plug is inserted in the bore and the top cap structure previously described is assembled to the valve.

PTFE exhibits a characteristic which is sometimes referred to as "memory." If a part is fabricated of PTFE and thereafter processed by heat and pressure to change the shape of the part from its original shape, for example, from a tube to a liner as herein described, the primary plastic memory of the part is of its original tubular shape and the secondary plastic memory is of the liner configuration. It is a characteristic of PTFE that unconfined hot or cold formed products tend to return to their original shape as the temperature thereof is increased, and in fact one test for determining whether a part has been hot or cold worked is to place the part in an oven and elevate the temperature of the part to about 700° to 715° to determine what changes in configuration take place. In the latter temperature range, a hot or cold worked part will revert to its original shape while at a lower temperature there will be at least some partial recovery of the part. In the case of the liner of the present invention, noticeable recovery starts at a relatively high temperature since temperatures of the order of 500°–600° F. were used in forming the liner from the tube, and complete recovery may be affected by heating the unconfined liner to a temperature of about 700° to 720° F.

The liner of the present invention exhibits a primary memory of its tubular shape and a secondary memory of its shape as shown in FIG. 1 for example. As the temperature of the liner is increased there is a tendency for the liner material to return to its tubular shape. By providing flared end portions 42 and 43 of the liner which are clamped between the corresponding end flange and the flange on the conduit, the ends of the liner are secured against movement inwardly through the ports 19 and 20. Further, the circumferential flange 56 clamped between the flat 37 and the top cap structure prevents the liner from returning to its tubular shape. Accordingly, the relatively high temperature used in processing as well as physical confinement of the liner operate to impart temperature stability to the final liner configuration.

Figure 10:
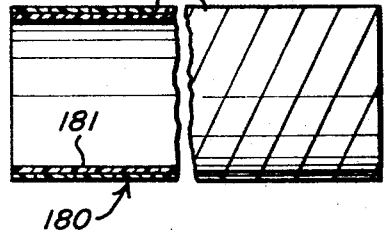
FIG. 10 is a view partly in section and partly in elevation of a tube used to provide a liner of two fluorocarbon materials in accordance with the present invention.

Referring now to FIG. 10, a tube 180 is shown including an inner tubular member 181 of PTFE and an outer tubular member 184 of a copolymer of tetrafluoroethylene and hexafluoropropylene. The outer tube 184 may be provided by spirally wrapping a tape around tube 181 or by forming a tube dimensioned to fit over the PTFE tube 181. Tube 180 is utilized to form a valve of the type described in FIG. 6 by the procedure previously described, and since the copolymer has a relatively high melt viscosity whereas PTFE has an infinite melt viscosity, the ballooning procedure previously described may be used to form the tubular liner shown in FIG. 6. During the ballooning procedure however, the outer tubular member 184 operates to wet both the outer surface of the PTFE tube 181 and the metal surfaces of the body and in effect acts as a cement to assist in maintaining the expanded PTFE tube 181 in position as a liner in addition to functioning as a vapor barrier as previously described.

The PTFE tubes 97 and 181 may be made by an extrusion technique well known in the art in which instance there may be present micro-voids as a result of removal of the organic solvent used as the carrier Teflon 6 and 6C for example) thereby permitting passage of relatively small percentages of vapors or gases through the liner. This relatively small percentage of voids may be reduced substantially as described hereinbefore with reference to the valve structure shown in FIG. 6. Alternatively, the tubular member of PTFE may be formed by an isostatic molding technique described in copending application Ser. No. 497,869 filed of even date herewith in which instance the percentage of micro-voids is extremely low because of the isostatic processing technique. Also, this technique provides a part having substantially uniform thermal and expansion characteristics and high density and therefore exhibits less tendency to form weak thin sections and/or highly stressed sections during the ballooning procedure by which the tube is formed into a liner in the valve body and accordingly the use of an isostatically formed tubular member is preferred in accordance with the present invention.

It is to be understood that the plug used with the valve in FIG. 6 may be that used in connection with FIG. 4 or that described in FIG. 1.

Valves made in accordance with the present invention have been subjected to various tests including use at 300° F. and a pressure of 120 pounds per square inch and have operated successfully. In another test, the valve was heat cycled from room temperature to 500° F. and performed satisfactorily. In another heat cycle test, oil at 400° F. was run through the valve and the valve operated satisfactorily.

What is claimed is:

1. A corrosion resistant valve comprising a one-piece metallic valve body having a bore, means in said body forming through ports communicating with said bore, said body including means forming spaced end flanges for mounting said valve to a conduit, closure means received in said bore for rotational movement from one position to another to interrupt flow through said valve, one-piece liner means of polytetrafluoroethylene covering said bore and said through ports and including end portions engaging said flanges whereby all fluid flow contact surfaces of said valve body are protected from corrosive fluids passing through said valve, said bore including spaced apart generally annular areas supporting said closure member through the interposed portions of said liner, and means in the body bore cooperating with said liner to form a high pressure seal area in the closed position of said valve for substantially complete shut-off of material flowing through said valve.

2. A valve as set forth in claim 1 wherein said closure means is a tapered plug and said body bore is tapered, and said valve including adjustable means for forcing said tapered plug into said tapered body for adjusting the sealing pressure between said body, closure means and the portion of said liner in said bore.

3. A corrosion resistant valve comprising a one-piece valve body having a bore, means in said body forming through ports communicating with said bore, said body including means forming spaced end flanges for mounting said valve to a conduit, closure means received in said bore for rotational movement from one position to another to interrupt flow through said valve, one-piece liner means of polytetrafluoroethylene covering said bore and said through ports and including end portions engaging said flanges whereby fluid flow contact surfaces of said valve body are protected from corrosive fluids passing through said valve, said bore including spaced apart generally annular areas supporting said closure means through the interposed portions of said liner, means in the body bore cooperating with said liner to form a high pressure seal area in the closed position of said valve for substantially complete shut-off of fluid passing through said valve, and said body including means in the open end of said bore for preventing substantially axial movement of the portion of the liner received in said bore in response to variations in temperature.

4. A corrosion resistant plug valve comprising a valve body having a tapered bore, means in said body forming through ports communicating with said bore, said body including means forming spaced end flanges for mounting said valve to a conduit, a tapered valve plug received in said bore for rotation from one position to another to control flow through said valve, one-piece liner means of polytetrafluoroethylene covering said bore and said through ports and including end portions engaging said flanges whereby all fluid contact surfaces of said valve body are protected from corrosive fluid passing through said valve, adjustable means forcing said tapered plug into said tapered body for adjusting the sealing pressure between said body, plug and the portion of said liner in said bore, said liner having a primary memory of a tubular configuration and a secondary memory of its liner configuration, said bore including axially spaced generally annular areas supporting said plug through the interposed portion of the liner, means in the body bore co-operatnig with the liner to form a high pressure seal area in the closed position of said valve for substantially complete shut-off of material flowing through said valve, and means in said body for maintaining the liner fixed in its liner configuration to prevent reversion of said liner to its tubular configuration in response to increase in temperature.

5. A corrosion resistant valve comprising a one-piece valve body having a bore, means in said body forming through ports communicating with said bore, said body including means forming spaced end flanges for mounting said valve to a conduit, closure means received in said bore for rotational movement from one position to another to interrupt flow through said valve, said closure means including a relatively thin coating of fluorocarbon resin on all of the fluid contacting surfaces thereof, one-piece liner means of polytetrafluoroethylene covering said bore and said through ports and including end portions engaging said flanges whereby all fluid flow contacting surfaces of said valve body and closure means are protected from corrosive fluids passing through said valve, said bore including axially spaced generally annular areas supporting said closure means through the interposed portions of said liner, means in the body bore cooperating with said liner to form a high pressure sealing surface in the closed position of said valve for substantially complete shut-off of material flowing through said valve, and means in said body for preventing the portions of said liner in said bore from moving axially in response to changes in temperature.

6. A corrosion resistant plug valve comprising a one-piece valve body having a tapered bore, means in said body forming through ports communicating with said bore, said body including means forming spaced end flanges for mounting said valve to a conduit, a tapered plug valve received in said bore for rotation from one position to another to interrupt flow through said valve, said plug including a relatively thin coating of fluorocarbon resin material on all fluid contacting surfaces thereof, one-piece liner means of polytetrafluoroethylene covering said bore and said through ports and including end portions engaging said flanges whereby all fluid flow contacting surfaces of said valve body and plug are protected from corrosive fluids passing through said valve, said bore including spaced apart generally annular areas supporting said plug through the interposed portions of said liner, means in the body bore cooperating with said liner to form a high pressure area in the closed position of said valve for substantially complete shut-off of material flowing through said valve, and means to maintain said plug in sealing relation with the portion of said liner in the bore during rotation from one position to another.

7. A valve as set forth in claim 6 wherein said body bore includes relief areas between said body ports, said liner including portions received in said relief areas and spaced from the outer surface of said plug.

8. A corrosion resistant valve comprising a valve body having a tapered bore including an open end, means in said body forming through ports communicating with said bore, said body including spaced end flanges for mounting said valve to a conduit, tapered plug means received in said bore for rotational movement from one position to another to interrupt flow through said valve, a one-piece liner of polytetrafluoroethylene covering said bore and said through ports and including end portions engaging said flanges whereby all fluid flow contact surfaces of said valve body are protected from corrosive fluids passing through said valve, means in the body bore cooperating with said liner to form a high pressure seal area in the closed position of said valve for substantially complete shut-off of material flowing through said valve, said bore including axially spaced generally annular areas supporting said tapered plug through the interposed portions of said liner, said body including a shoulder at the open end of said bore, said liner including flange means positioned over said shoulder, and cap means received in sealing relation on said body and maintaining said flange in sealing engagement with said shoulder.

9. A corrosion resistant plug valve comprising a one-piece metallic valve body having a tapered bore extending transversely thereof, means in said body forming through ports communicating with said bore, said body including spaced end flanges for mounting said valve to a conduit, a tapered valve plug received in said bore for rotational movement from one position to another to interrupt flow through said valve, one-piece liner means of polytetrafluoroethylene covering said bore and said through ports and including end portions engaging said flanges whereby all fluid flow contact surfaces of said valve body are protected from corrosive fluids passing through said valve, adjustable means forcing said tapered plug into said tapered bore for adjusting the sealing pressure between said body, plug and the portion of said liner in said bore, said body including means at the open end thereof defining a circumferential flat, said liner including a circumferential flange overlying said flat, top cap means including means establishing a seal with said plug and maintaining said flange in fixed relation relative to said flat, means in said bore forming spaced relief areas between said body ports, said liner including means received in said relief areas and spaced from the outer surface of said plug to reduce the turning torque thereof, the non-relieved area of said bore cooperating with said liners to form high pressure seal areas preventing flow of fluid through said valve in the closed position thereof, said valve plug including a relatively thin coating of fluorocarbon resin on all fluid contacting surfaces thereof, and said liner means having a primary memory of a tubular configuration and a secondary memory of its liner configuration.

10. A plug valve as set forth in claim 9 wherein said liner is an expanded tube isostatically molded to reduce the percentage of micro-voids in the liner.

References Cited

UNITED STATES PATENTS

| | | | |
|---|---|---|---|
| 1,827,266 | 10/1931 | Shipley | 137—375 |
| 1,998,882 | 4/1935 | Merrill | 137—375 |
| 2,792,845 | 5/1957 | Atherton et al. | 137—375 |
| 3,015,855 | 1/1962 | Merkel | 264—127 |
| 3,235,636 | 2/1966 | Trimble | 264—127 XR |
| 3,235,637 | 2/1966 | Hoffman et al. | 264—127 XR |
| 3,329,398 | 7/1967 | Goldsmith | 251—306 |

FOREIGN PATENTS

| | | |
|---|---|---|
| 566,811 | 12/1958 | Canada. |
| 1,044,271 | 6/1953 | France. |

HENRY T. KLINKSIEK, *Primary Examiner.*

U.S. Cl. X.R.

251—312; 264—127, 267

UNITED STATES PATENT OFFICE
CERTIFICATE OF CORRECTION

Patent No. 3,438,388                                April 15, 1969

Robert C. Schenck, Jr.

It is certified that error appears in the above identified patent and that said Letters Patent are hereby corrected as shown below:

Column 4, line 40, after "body" insert -- 10 --. Column 5 line 1, beginning with "the liner" cancel all to and including "eliminated." in line 4, same column 5, and insert -- the liner relative to the body. By providing flared end portions 42 and 43 of the liner which engage end flanges 21 and 23, several difficulties encountered in conventional bore liners have been eliminated. --; line 28, "or" should read -- of --; line 38, "is static" should read -- isostatic --. Column 12, after line 5, insert the following references:

| | | | |
|---|---|---|---|
| 2,777,783 | 1/1957 | Welch. | |
| 3,011,219 | 12/1961 | Williams | ----------- 264-242 |
| 3,073,336 | 1/1963 | Johnson | ----------- 137-375 |
| 3,148,896 | 9/1964 | Chu | ---------------- 137-375XR |
| 3,157,195 | 11/1964 | McIntosh et al. | ---- 137-375 |
| 3,227,174 | 1/1966 | Yost | --------------- 137-375 |
| | (Filed 4/1963) | | |

Signed and sealed this 3rd day of February 1970.

(SEAL)
Attest:

EDWARD M. FLETCHER, JR.                       WILLIAM E. SCHUYLER, JR.
Attesting Officer                                  Commissioner of Patents